M. J. KLEIN.
SIDE FORCE AND DANGER INDICATOR.
APPLICATION FILED MAY 24, 1915. RENEWED MAR. 1, 1918.

1,286,347.

Patented Dec. 3, 1918.
3 SHEETS—SHEET 1.

WITNESSES:

INVENTOR
Mathias J. Klein
BY Carl P. Goepel
ATTORNEY

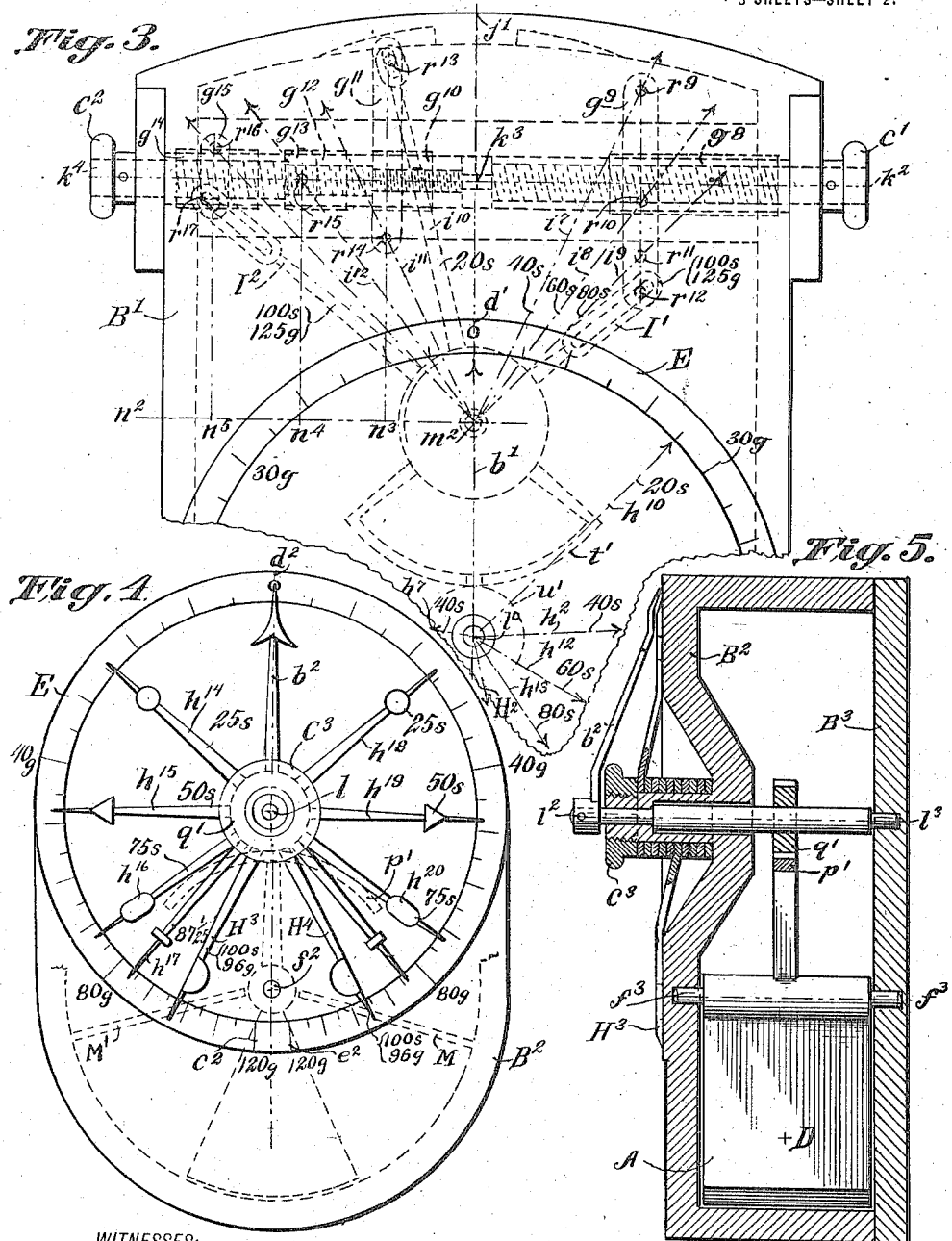

M. J. KLEIN.
SIDE FORCE AND DANGER INDICATOR.
APPLICATION FILED MAY 24, 1915. RENEWED MAR. 1, 1918.

1,286,347.

Patented Dec. 3, 1918.
3 SHEETS—SHEET 3.

INVENTOR
Mathias J. Klein
BY Carl P. Goepel
ATTORNEY

UNITED STATES PATENT OFFICE.

MATHIAS J. KLEIN, OF NEW YORK, N. Y.

SIDE-FORCE AND DANGER INDICATOR.

1,286,347.     Specification of Letters Patent.     Patented Dec. 3, 1918.

Application filed May 24, 1915, Serial No. 30,061. Renewed March 1, 1918. Serial No. 219,868.

*To all whom it may concern:*

Be it known that I, MATHIAS J. KLEIN, a citizen of the United States, residing in New York, borough of Manhattan, in the county and State of New York, have invented certain new and useful Improvements in Side-Force and Danger Indicators, of which the following is a specification.

This invention relates to indicators to be used on motor vehicles (automobiles) and other vehicles, having three or more road wheels; its object being to show, in the first place, the danger to the vehicle of being turned over, when the latter is moving in a curve at a more or less high speed, and, secondly, to show the so-called "side-force" acting sidewise on the vehicle to the right or to the left.

The invention consists of a pendulum (oscillating in a casing), put in a certain position usually on the dashboard of a motor vehicle in front of the vehicle driver; an index-hand not directly connected to the pendulum body or axis, is moving over a dial; the oscillations of the pendulum are transmitted to said index-hand by means of gear wheels, and thereby, the oscillation angle of the index-hand may be considerably larger than the corresponding oscillation angle of the pendulum, and so large scale divisions are obtained. Said dial has always (on a double acting indicator) two so-called "danger-marks" or "danger hands", which have fixed or variable positions on the dial, and usually one or more scale pairs, said index-hand showing on the latter the side-force acting on the vehicle in a direct or indirect way, and when either of said danger-marks (or hands) is reached by the index-hand, the vehicle is turned over by said side-force. If, therefore, (vehicle moving in any curve on a level or banked road), the index-hand comes more or less near to one of said danger-marks (or hands), the vehicle is more or less in danger of being turned over.

The danger-marks (or hands) change their positions on the dial usually (but not always) with the load of the vehicle; one of the danger-marks acts for right hand, and the other for left hand vehicle turns. The scales on the dial may be non-variable (constant) scales, or variable so-called "side-force scales"; the latter show the side-force directly, the former indirectly; no scales on the dial, would only show the turn over danger of the vehicle (as before described), but the side-force could not be read off, it could only be roughly estimated, as the index-hand comes more or less near to one of said danger-marks (or hands).

The definition of "center line", of "side normal", of "side-force angle", of "turn over angle", of "turn over side-force", of "tangent of side-force angle", of "tangent of turn over angle" and "its value", is the same as in my former application above mentioned. The side-force (acting always on the center of gravity of the loaded or unloaded vehicle, in the direction of said side normal), is shown by the index-hand of the indicator on the scale or scales of the dial in percentage of the turn over side-force, in a direct way, when variable side-force scales are used, and in an indirect way when non-variable (constant) scales are used on the dial of the indicator. Said side-force increases in the same proportion as the tangent of the side-force angle increases. The danger marks (or handle) on the dial (corresponding to the turn over angle of the pendulum), represent always the 100% side-force (the turn over side-force of the vehicle), and are marked with "$100s$" in this application, but may be marked in some other way; if the index-hand reaches (for instance) the $40s$ mark (or hand) of a side-force scale, when the vehicle is moving in a curve, a side-force of $40s$ or 40% (that is, 40/100 or 2/5 of the turn over side-force) is shown. 100 times the tangent of the turn over angle, would give the position of the corresponding danger-mark (or hand) on a non-variable grade scale; this gives the fixed relation between the positions of the danger-marks on the dial and the position of the center of gravity of the loaded or unloaded vehicle. If the vehicle stands (or moves straight) on a level road, the index-hand of the indicator must point to the zero-mark of the dial (showing a side-force of 0%). The line from said zero-point to the oscillation or turning axis of the index-hand, is the so-called "zero-line" of the dial. If the vehicle stands (or is moving straight) on a banked road, a component power of the vehicle weight will produce a side-force of (for instance) 30s or 30% (which is shown by the indicator); if now the vehicle moves in a curve on said banked road, a centrifugal force of (100−30)=70% or (100+30)= 130% (side-force) has to be produced (according to the way of turning), before the index-hand reaches 100s and the vehicle turns over; if the latter is turning on a level road, a centrifugal force of 100% (side-force) must always be produced, before the index-hand reaches 100s on the dial of the indicator.

All the indicators described in the following are double acting, because they show the side-force and turn over danger for right and left hand turns of the vehicle; the scales on the dial are therefore double scales (or scale pairs); one of the scales with its danger-mark is on one side of the zero-line (acting for right hand turns), and the other scale with its danger-mark is on the other side of said zero-line (and acting for left hand turns of the vehicle).

Each scale of a variable side-force scale pair consists of a certain number of scale-hands, all turning around the turning axis of the index-hand, the 100s hands are the two danger-hands; each of said scale-hands shows always the same side-force when it is reached by the index-hand. All scale-hands are set to their proper places (by hand in some way), according to the load of the vehicle. Three different constructions of variable side-force scales are shown and described in the following.

Said double acting indicator must be mounted on a four wheeled vehicle (the latter standing on a level road) in such a way, that the oscillation or swinging axis of the pendulum is parallel and near to the center line of the vehicle, and its index-hand points to the zero-point, otherwise its place on the vehicle is optional.

On a four wheeled vehicle, the indicator always gives correct indications, but on a three wheeled vehicle, the indications of said double acting indicator are only nearly correct; single acting indicators have to be used on three wheeled vehicles, in order to have correct indications in that case, as will be shown in another application.

In the accompanying drawing,

Figure 1 is a front view,

Fig. 2 a vertical section of a double acting side-force and danger indicator with a variable side-force scale pair on the dial;

Fig. 3 shows some other constructions of a variable side-force scale pair;

Fig. 4 is a front view,

Figure 1:
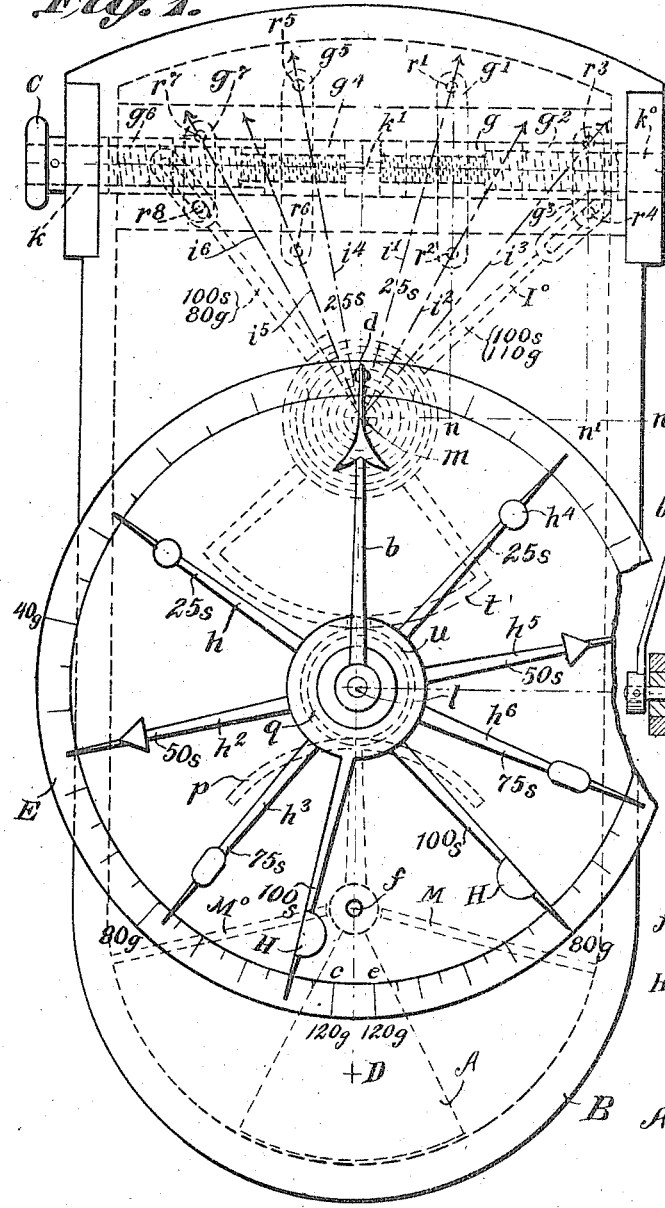
Figure 2:
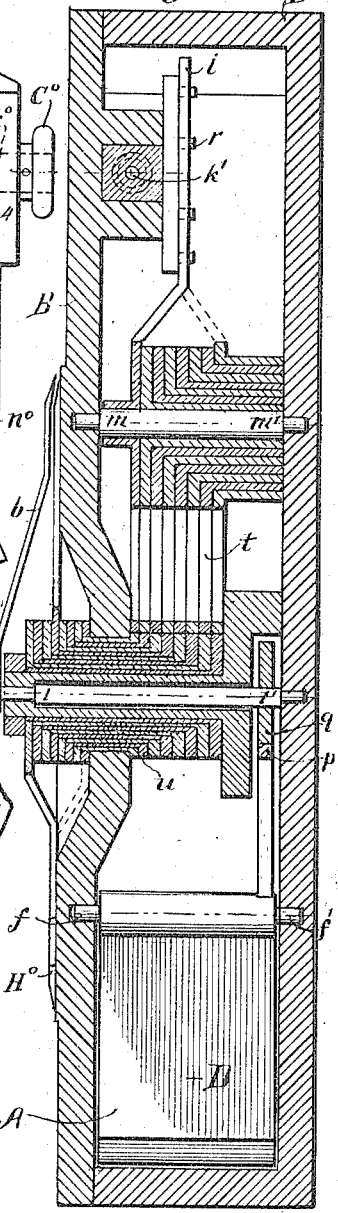
Figure 6:
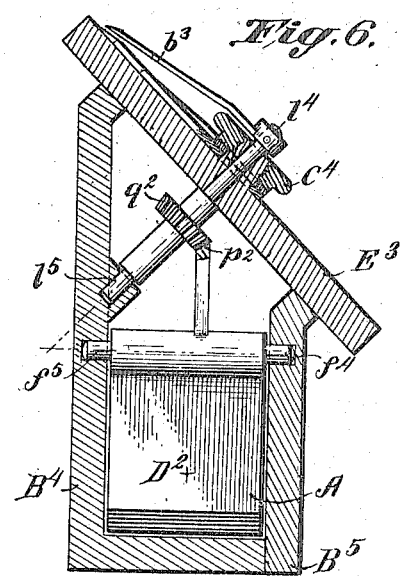
Figure 8:
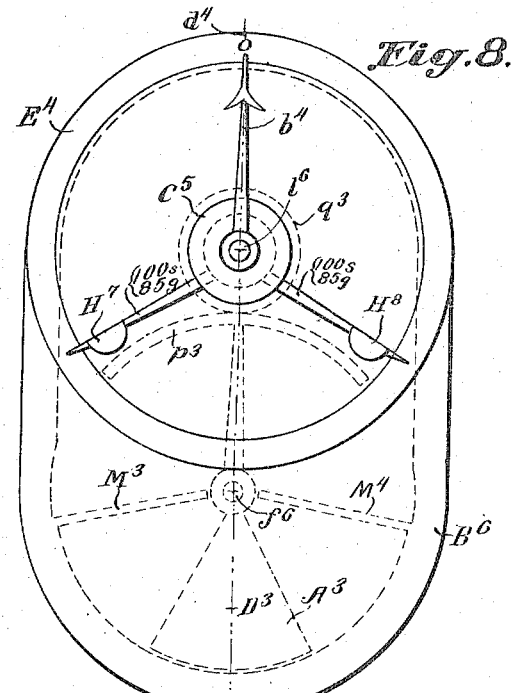
Figure 7:
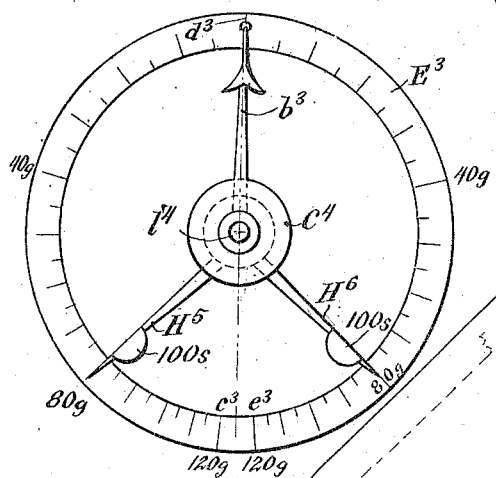
Figure 9:
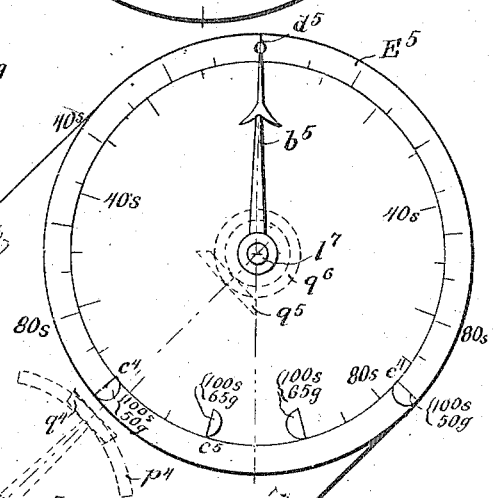

Fig. 5 a vertical section of an indicator, which is a modification of the arrangement shown in the Figs. 1, 2 and 3, of simpler construction;

Fig. 6 is a vertical section of an indicator, in which the oscillations of the pendulum are transmitted to the index-hand by means of a pair of bevel gears;

Fig. 7 shows the dial of the (Fig. 6) indicator;

Fig. 8 is a front view of a double acting indicator with no scale or scales on the dial, and Fig. 9 is a front view of an indicator, in which the pendulum oscillations are transmitted to the index-hand by means of two pairs of bevel gears.

Similar letters of reference indicate corresponding parts in all figures.

The pendulum A of the double acting indicator shown in the Figs. 1 and 2, oscillates around the pendulum axis $f\ f^1$, the latter having bearings in the casing B B°. The index-hand $b$, connected to shaft $l\ l^1$, turns around the axis of $l\ l^1$, and thereby moves over the dial E of the indicator; the gear sector $p$, connected to the pendulum A, meshes with the small gear wheel $q$, which is connected to shaft $l\ l^1$ of the index-hand $b$; the radius of gear sector $p$ is much larger than the radius of gear wheel $q$, and therefore the oscillations of index-hand $b$ are much larger than the corresponding oscillations of the pendulum A; if the radius of gear sector $p$ is (for instance) three times the radius of gear wheel $q$, then the pendulum oscillations are increased in the proportion (or ratio) of 3:1 by the index-hand. The center of gravity of pendulum A and gear sector $p$ is at D. The dial E has its zero-point 0 at $d$; $l\ 0\ d$ or $l\ d$ is therefore the zero-line of dial E. If the vehicle is standing on a level road, the line $f$ D (Fig. 1) of the pendulum has a vertical position and the index-hand $b$ points to 0 (zero); the zero-line $l\ 0\ d$ or $l\ 0$ has also a vertical position, but may have any other direction. The dial E is provided with the non-variable grade scale pair $d\ c$ and $d\ e$ (each scale having the range from 0 to 120$g$); the scale $c\ d$ (on the left of the zero-line $l\ d$) acting for right hand turns, and the scale $d\ e$ (on the right of the zero-line) acting for lefthand turns of the vehicle. If the vehicle is at rest or moves in a straight line, the index-hand $b$ would show on said grade scale pair $c\ d\ e$ the banking grade of the road. The dial E has also a variable side-force scale pair, consisting of the scale-hands $h^1$, $h^2$, $h^3$ and H° (acting for right hand turns), and the scale-hands $h^4$, $h^5$, $h^6$ and H (acting for left hand turns of the vehicle); H° and H are the two danger-hands; all eight scale-hands (each connected to a hollow shaft) turn around the turning center $l$ of the index-hand $b$; each of said scale-hands shows always the same side-force when it is reached by the index-hand $b$; $h^1$ and $h^4$ show always a side-force of $25s$, $h^2$ and $h^5$ of $50s$, $h^3$ and $h^6$ of $75s$, and $H^0$ and $H$ (the danger-hands) of $100s$.

The eight auxiliary hands $i^1$, $i^2$, $i^3$, $I^0$, and $i^4$, $i^5$, $i^6$, $I$ (each connected to a hollow shaft which all turn around the axis $m\ m^1$) are provided each with a radial slot (only the slots of $I^0$ and $I$ are shown) in which a pin moves; the line $m\ j$ is called the auxiliary zero-line, which is shown in the direction of the zero-line $l\ d$, but may have any other direction or position. The two hand-screw shafts $k^0\ k^1$ and $k\ k^1$ (mounted normal to the plane $j\ m\ m^1$), turn in bearings of the casing $B\ B^0$, and each of them has two screws of different pitch, which move the four nuts $g$, $g^2$, $g^4$ and $g^6$ in a slot of the casing normal to $m\ j$, when said hand-screw shafts are turned by means of the hand buttons $C$ and $C^0$; the straight bar $g^1$ with the pins $r^1$ and $r^2$ is connected to nut $g$, the bar $g^3$ with the pins $r^3$ and $r^4$ is connected to nut $g^2$, the bar $g^5$ with the pins $r^5$ and $r^6$ is connected to nut $g^4$, and the bar $g^7$ with the pins $r^7$ and $r^8$ is connected to nut $g^6$; the eight pins $r^1$, $r^2$, $r^3$, $r^4$ and $r^5$, $r^6$, $r^7$, $r^8$, move in slots of the eight auxiliary hands $i^1$, $i^2$, $i^3$, $I^0$ and $i^4$, $i^5$, $i^6$, $I$, respectively (one pin in each slot). The four straight bars $g^1$, $g^3$, $g^5$ and $g^7$, are always parallel to said auxiliary zero-line $m\ j$; the extension of line $r^1\ r^2$ cuts the line $m\ n^0$ (normal to $m\ j$) in point $n$, and the extension of line $r^3\ r^4$ cuts line $m\ n^0$ in point $n^1$; the pitches of the two screws of the hand-screw shaft $k^0\ k^1$ are in the ratio of $mn$ to $mn^1$; the proportion $mn/mn^1$ (which is $2/5$ in the drawing, but may be some other proportion) therefore remains constant by turning of the hand-screw shaft $k^0\ k^1$; the same is the case on the left of $m\ j$, by turning the other hand-screw shaft $k\ k^1$. The eight auxiliary hands $i^1$, $i^2$, $i^3$, $I^0$, and $i^4$, $i^5$, $i^6$, $I$, move the corresponding eight scale hands $h^1$, $h^2$, $h^3$, $H^0$ and $h^4$, $h^5$, $h^6$, $H$ of dial $E$ by means of the eight gear wheel sectors $t$ and the eight gear wheels $u$, to their proper places, when the hand-screw buttons $C^0$ and $C$ are turned by hand; the radii of the gear wheel sectors $t$ are in the same proportion to the radii of gear wheel $u$, as the radius of gear sector $p$ to the radius of gear wheel $q$. The pins $r^1$ and $r^2$ on bar $g^1$ move (by means of the auxiliary hands $i^1$, $i^2$, and gear wheels $t$ and $u$) the scale hands $h^1$ and $h^2$ respectively; as the latter show the side-forces $25s$ and $50s$ respectively, and $25s/50s = 1:2$, the proportion $r^2n/r^1n$ must be $1:2$ also; and in the same way $r^4n^1/r^3n^1$ must be $3:4$, because the scale hands $h^3$ and $H^0$ (moved in the same way by the pins $r^3$ and $r^4$), show the side-forces $75s$ and $100s$ respectively, and $75s/100s = 3:4$. If for a certain load of the vehicle, the tangent of the turn over angle of the pendulum would be $1.10$ for right and left hand vehicle turns, then the buttons $C^0$ and $C$ are turned by hand, until the danger-hand $H^0$ reaches $110g$ on the grade scale $c\ d$, and danger-hand $H$ reaches $110g$ on the grade scale $d\ e$, and thereby the other scale-hands $h^1$, $h^2$, $h^3$, and $h^4$, $h^5$, $h^6$, are automatically moved to their proper places on dial $E$.

Instead of the four scale-hands of each scale of the variable side-force scale pair on dial $E$ Fig. 1, there may be any other number of scale-hands for each scale pair, for instance five (as shown on dial $E^1$ Fig. 3 for left hand turns), showing the side-forces $20s$, $40s$, $60s$, $80s$ and $100s$ (by the variable scale-hands $h^{10}$, $h^{11}$, $h^{12}$, $h^{13}$ and $H^2$) respectively, when reached by the index-hand $b^1$ ($l^0\ d^1$ is the zero-line of $E^1$, and $l^0$ the turning center of index-hand $b^1$); the corresponding five auxiliary hands $i^{10}$, $i^{11}$, $i^{12}$, $i^{13}$ and $I^2$ (on the left of auxiliary line $m^2\ j^1$) all turning around $m^2$, are moved by the three bars $g^{11}$ (with pins $r^{13}$ and $r^{14}$), $g^{13}$ (with pin $r^{15}$), and $g^{15}$ (with pins $r^{16}$ and $r^{17}$), connected to the screw nuts $g^{10}$, $g^{12}$ and $g^{14}$ respectively, and hand-screw shaft $k^4\ k^3$ (with hand button $C^2$), for left hand turns of the vehicle.

On the right of auxiliary line $m^2\ j^1$ (Fig. 3) is shown another construction, with only one straight bar for the auxiliary hands for right hand turns of the vehicle; the corresponding variable side-force scale on dial $E^1$ has only four variable scale hands, showing the side-forces $40s$, $60s$, $80s$ and $100s$ (by the scale hand $h^7$, $h^8$, $h^9$ and $H^1$); the four auxiliary hands (of said four scale hands) are $i^7$, $i^8$, $i^9$ and $I^1$ (all turning around $m^2$), they are moved by the one bar $g^9$ (with the pins $r^9$, $r^{10}$, $r^{11}$ and $r^{12}$) connected to the screw nut $g^8$, and hand-screw shaft $k^3\ k^2$ (with hand button $C^1$); the latter has only one screw, while shaft $k^4\ k^3$ has three screws of different pitches, varying in the proportion $n^3m^2 : n^4m^2 : n^5m^2$; the line $m^2\ n^2$, parallel to $k^2\ k^4$, is normal to $m^2\ j^1$; the extensions of the middle lines of the three bars $g^{11}$, $g^{13}$ and $g^{15}$ (all parallel to $m^2\ j^1$), cut the line $m^2\ n^2$ in the points $n^3$, $n^4$ and $n^5$ respectively. Each of the 9 auxiliary hands (shown in Fig. 3), is provided with a radial slot (the slots of $I^1$, $i^{10}$ and $I^2$ are only shown). On the right of auxiliary line $m^2\ j^1$ is only one straight bar for moving one half of all the auxiliary hands, but on the left of $m^2\ j^1$, there are a group (a plurality) of straight bars for moving the rest of the auxiliary hands. The dial $E^1$ is also provided with a non-variable grade scale pair. The 9 auxiliary hands (Fig. 3) transmit their motion (when the hand buttons $C^1$ and $C^2$ are turned by hand) to the corresponding 9 scale hands of dial $E^1$, by means of the 9 gear wheel pairs $t^1$ and $u^1$ in the same way as in the Figs. 1 and 2 arrangement. All other parts of the Fig. 3 indicator (not shown) are arranged similarly as in the Figs. 1 and 2.

The two axes of the hand screw shafts $k^0$ $k^1$ and $k$ $k^1$ (Fig. 1) are shown in one line, but they may be arranged in parallel lines; one nearer to $m$ $m^1$ than the other. In case the center of gravity of the vehicle for different loads remains in the same center line, or goes only vertically up or down, then the two hand screw shafts $k^0$ $k^1$ and $k$ $k^1$ (Fig. 1) may be connected by $k^1$ and moved together by only one hand button C; in that case, the screws on one side of the auxiliary line $m$ $j$ are right handed, and on the other side of $m$ $j$ they are left handed.

In the modification shown in Figs. 4 and 5, the auxiliary hands with their pins, bars and gear wheels are left away, the construction of the indicator is thereby much simplified. To the pendulum $A^1$, with the oscillation axis $f^2$ $f^3$ (turning in bearings in the casing $B^3$ $B^2$), is connected the gear sector $p^1$, which meshes with the small gear wheel $q^1$ connected to shaft $l^2$ $l^3$; to the latter; index-hand $b^2$ is connected which moves over dial $E^2$; in this way the pendulum oscillations are transmitted to the index-hand in an increased ratio. The center of gravity of pendulum $A^1$ and gear sector $p^1$ is at $D^1$; the center of gravity of gear wheel $q^1$, of shaft $l^2$ $l^3$ and index-hand $b^2$, must be in the axis $l^2$ $l^3$. The dial $E^2$, with its zero line $l^2$ $0$ $d^2$ has two scale pairs, the non-variable grade scale pair $c^2$ $d^2$ $e^2$ (each scale extending to $120g$), and a variable side-force scale pair, consisting of the scale-hands $h^{14}$, $h^{15}$, $h^{16}$, $h^{17}$, $H^3$ and $h^{18}$, $h^{19}$, $h^{20}$, $h^{21}$, $H^4$ showing the side-forces $25s$, $50s$, $75s$, $87$-$1/2s$ and $100s$ respectively, (when reached by the index-hand) for right and left hand vehicle turns; all ten scale hands (turning around the axis $l^2$ $l^3$ of the index-hand) are set by hand (by loosening and tightening of the hand screw button $C^3$), to their proper places according to the load of the vehicle. If the tangent of the turn over angle for a certain vehicle load is (for instance) 0.96, for right and left hand vehicle turns, then the danger-hands $H^3$ and $H^4$ must point each to $96g$ of the grade scale pair, $h^{14}$, showing always a side-force of $25s$, must point to $(25/100=1/4$ of $96)$ $24g$, $h^{15}$ to $(50/100$ of $96)$ $48g$, and so on. Instead of showing the side-forces $25s$, $50s$, $75s$, $87$-$1/2s$ and $100s$, said scale hands may be set differently, for instance, so as to show the side-forces $20s$, $40s$, $60s$, $80s$ and $100s$, or so as to show the side-forces $40s$, $60s$, $80s$, $90s$ and $100s$. Instead of five scale-hands for each scale, any other number may be used. As here (Fig. 4), each scale hand of the variable side-force scale pair has to be set by hand, it takes much more time to change said side-force scale pair for another vehicle load, as it takes in the Fig. 1 or 3 case, where only the two danger-hands have to be set by hand, while all other scale hands move automatically to their proper places.

In the modification shown in Fig. 6, in a vertical section, the oscillations of the pendulum $A^2$ are transmitted to the index-hand $b^3$ by means of the bevel gears $p^2$ and $q^2$; the pendulum $A^2$ with bevel gear sector $p^2$ turns around the axis of $f^4$ $f^5$ (the latter has bearings in the casing $B^4$ $B^5$), $D^2$ is the center of gravity of $A^2$ and $p^2$; to shaft $l^4$ $l^5$ are connected the small bevel gear wheel $q^2$ and the index-hand $b^3$; $q^2$ meshes with $p^2$, and so the oscillations of the pendulum $A^2$ are transmitted to the index-hand $b^3$ in an increased ratio, the latter moves over dial $E^3$ (Figs. 6 and 7); said dial with the zero-line $l^4$ $d^3$ has the grade scale pair $c^3$ $d^3$ $e^3$ and the two variable danger-hands $H^5$ and $H^6$ turning around the center $l^4$; $H^5$ and $H^6$ are set by hand (according to the vehicle load) and kept in position by the hand button $C^4$. The index-hand $b^3$ shows the side-force indirectly on said grade scale pair $c^3$ $d^3$ $e^3$ for right and left hand vehicle turns; the inclined position of dial $E^3$ may be more convenient for the vehicle driver than a vertical position of the indicator dial. Said dial $E^3$ has no variable scale hands except the two danger-hands; and is therefore simpler in construction than dial $E^2$ of Fig. 4.

The modification shown in a front view in Fig. 8, is still simpler in construction, the non-variable grade scale pair (shown in all arrangements above described) is also left away; its dial has therefore no scale or scale-pair. The pendulum $A^3$ (having bearings in casing $B^6$) oscillates around the axis at $f^6$, the gear wheel sector $p^3$ connected to the pendulum, meshes with the small gear wheel $q^3$, which is connected to the shaft of the index-hand $b^4$, the latter turns around the center $l^6$ and moves over dial $E^4$; $l^0$ $d^4$ is the zero-line of the dial; the two danger-hands $H^7$ and $H^8$, turning around the center $l^6$ are set by hand (according to vehicle load), and kept in position by the hand screw button $C^5$ in the same way as in the Fig. 6 arrangement. $D^3$ is the center of gravity of pendulum $A^3$ and gear sector $p^3$. As the dial $E^4$ has no scales, the side-force can only be estimated, but the turn over danger is indicated in the said way, as by all other indicators before described.

In the modification, shown in a front view in Fig. 9, the pendulum oscillations are transmitted to the index-hand by means of two pairs of bevel gears, and thereby the dial $E^5$ can be arranged more or less sidewise of the pendulum $A^4$ nearer to the vehicle driver. The pendulum $A^4$ (having bearings in casing $B^7$) oscillates around the axis at $f^7$, the bevel gear sector $p^4$, connected to the pendulum, meshes with the small bevel gear $q^4$; the latter and bevel gear $q^5$ are connected to a shaft having the direction $f^7$ $l^7$ and mounted in bearings of the casing $B^7$; $q^5$ meshes with bevel gear $q^6$, the latter is connected to the shaft of the index-hand $b^5$, which turns around the center $l^7$, and moves over the dial $E^5$ of the double acting indicator. $D^4$ is the center of gravity of pendulum $A^4$ and bevel gear sector $p^4$; $l^7$ $d^5$ is the zero-line of the dial, which has the two side-force scale pairs $c^4$ $d^5$ $e^4$ and $c^5$ $d^5$ $e^5$, which are acting, one for a certain load of the vehicle, and the other for the unloaded vehicle. The index-hand $b^5$ shows on said side-force scales directly the side-force acting on the turning vehicle. For more than two different vehicle loads, more than two side-force scale pairs (a plurality of side-force scale pairs) may be used on the dial. If on the dial of Fig. 9, one side-force scale-pair is left away, the remaining pair of side force scales shows the side force directly for one load of the vehicle.

The partitions $M^0$ and $M$ in the casing of Fig. 1, and the partitions $M^1$, $M^2$ in Fig. 4, $M^3$ and $M^4$ in Fig. 8, and $M^5$, $M^6$ in Fig. 9, have the object to stop the oscillations of the pendulum quickly. The shape of the pendulums may be different from the shape shown in the drawings, and for the different arrangements of the double acting indicator (as shown), equivalent constructions may be used.

Having thus described my invention, I claim as new and desire to secure by Letters Patent:—

1. In a double acting side-force and danger indicator for vehicles, the combination of a casing, a pendulum in said casing, a dial on said casing having two variable danger-hands (one on each side of the zero-line) but no scales, the positions of said danger-hands on said dial having a fixed relation to the position of the center of gravity of the loaded vehicle, and an index-hand moving over said dial, the oscillation axis of the pendulum being parallel with and near to the center-line of the vehicle, means for transmitting the oscillations of the pendulum to said index-hand, the latter showing thereby on said dial when the vehicle is moving in a curve, the increased danger of the vehicle being turned over, when said index-hand comes more or less close to one of said two danger-hands.

2. In a double acting side-force and danger indicator for vehicles, the combination of a casing, a pendulum in said casing, a dial on said casing with an index-hand moving over said dial, the latter having a plurality of side-force scale pairs, corresponding to a plurality of different vehicle loads, the two 100s marks of each scale pair are the two acting danger-marks of the dial, when said scale pair is acting for a certain vehicle load, the positions of the acting two danger-marks on the dial having a fixed relation to the position of the center of gravity of the corresponding load of the vehicle, means for transmitting the oscillations of the pendulum to said index-hand, the oscillation axis of the pendulum being parallel with and near to the center line of the vehicle, said index-hand showing thereby on one of said acting side-force scale pair when the vehicle is moving in a curve, the side-force acting on the vehicle, and the increased danger of the latter being turned over, when said index-hand comes more or less close to one of said two acting danger-marks.

3. In a double acting side-force and danger indicator for vehicles, the combination of a casing, a pendulum in said casing, a dial on said casing with an index-hand moving over said dial, the oscillations of the pendulum being transmitted to said index-hand by means of gear wheels, in an increased ratio, said dial having two variable danger-hands (one on each side of the zero-line) and two scale-pairs, one being a non-variable grade scale-pair, and the other a variable side-force scale-pair, each scale of the latter consisting of a certain number of scale-hands turning around the turning center of the index-hand, each scale-hand being (by means of said non-variable grade scale-pair) set by hand according to vehicle load, the positions of said danger-hands on said dial having a fixed relation to the position of the center of gravity of the loaded vehicle, the oscillation axis of the pendulum being parallel with and near to the center-line of the vehicle, said index-hand showing thereby on said side-force scales when the vehicle is moving in a curve, the side-force acting on the vehicle, and the increased danger of the latter being turned over, when said index-hand comes more or less close to one of said two danger-hands.

4. In a double-acting side-force and danger indicator for vehicles, the combination of a casing, a pendulum in said casing, a dial on said casing with an index-hand moving over said dial, the oscillations of the pendulum being transmitted to said index-hand by means of gear wheels, in an increased ratio, said dial having two variable danger-hands (one on each side of the zero-line) and two scale pairs, one being a non-variable grade scale-pair, and the other a variable side-force scale-pair, each scale of the latter consisting of a certain number of scale-hands turning around the turning center of the index-hand, each scale-hand being moved (by means of gear wheels) by an auxiliary hand, all auxiliary hands turning around another fixed point, the turning angle of each scale-hand to the corresponding turning angle of its auxiliary hand being in the same proportion as the oscillation angle of the index-hand to the corresponding oscillation angle of the pendulum, each of said auxiliary hands having a radial slot in which a pin moves, all the pins being connected (in two straight lines which are always parallel to said auxiliary zero-line) to two bars, one of them acting for right hand turns and the other for left hand turns of the vehicle, each of said bars (with their pins being moved normally to said auxiliary zero-line by means of a hand screw-shaft, one of said two hand screw-shafts moving (or setting) one half of all scale-hands (by means of said non-variable grade scale-pair) to their proper places according to the load of the vehicle for right hand turns, and the other hand screw-shaft moving (or setting) the rest of the scale-hands in the same way for left hand vehicle turns, so that each of said scale-hands shows always the same side-force when said index-hand reaches it, the positions of said danger-hands on said dial having a fixed relation to the position of the center of gravity of the loaded vehicle, the oscillation-axis of the pendulum being parallel with and near to the center-line of the vehicle, said index-hand showing thereby on said side-force scales when the vehicle is moving in a curve, the side-force acting on the vehicle, and the increased danger of the latter being turned over, when said index-hand comes more or less close to one of said two danger-hands.

5. In a double acting side-force and danger indicator for vehicles, the combination of a casing, a pendulum in said casing, a dial on said casing with an index-hand moving over said dial, the oscillations of the pendulum being transmitted to said index-hand by means of gear wheels in an increased ratio, said dial having two variable danger-hands (one on each side of the zero-line) and two scale pairs, one being a non-variable grade scale-pair, and the other a variable side-force scale-pair, each scale of the latter consisting of a certain number of scale-hands turning around the turning center of the index-hand, each scale-hand being moved (by means of gear wheels) by an auxiliary hand, all auxiliary hands turning around another fixed point, the turning angle of each scale-hand to the corresponding turning angle of its auxiliary hand, being in the same proportion as the oscillation angle of the index-hand to the corresponding oscillation angle of the pendulum, each of said auxiliary hands having a radial slot in which a pin moves, all pins being connected to two groups of straight bars (the latter are always parallel to said auxiliary zero-line), one group of bars (on one side of the auxiliary zero-line) acting for right hand turns, and the other group of bars (on the other side of said auxiliary zero-line) acting for left hand turns of the vehicle, each group consisting of a certain number of bars, to each of the latter being connected a certain number of said pins, each of said bar groups (with all their pins) being moved normal to said auxiliary zero-line by means of a hand screw shaft, the latter having so many screws of different pitches, as there are bars in the group, one of said two hand screw-shafts moving (or setting) one half of all scale-hands (by means of said non-variable grade scale-pair) to their proper places according to the load of the vehicle for right hand turns, and the other hand screw-shaft moving (or setting) moves (or sets) the rest of the scale hands in the same way for left hand vehicle turns, so that each of said scale-hands shows always the same side-force when said index-hand reaches it, the positions of said danger-hands on said dial having a fixed relation to the position of the center of gravity of the loaded vehicle, the oscillation axis of the pendulum being parallel with and near to the center line of the vehicle, said index-hand showing thereby on said side-force scales when the vehicle is moving in a curve, the side-force acting on the vehicle, and the increased danger of the latter being turned over, when said index-hand comes more or less close to one of said two danger-hands.

6. In a double acting side force and danger indicator for vehicles, the combination of a casing, a pendulum in said casing, a dial on said casing having two danger hands and a non-variable scale pair of any kind, the positions of said danger hands on said dial having a fixed relation to the position of the center of gravity of the loaded vehicle, an index hand moving over said pair of scales, the oscillation axis of the pendulum being parallel with and near the center line of the vehicle, means for transmitting the oscillations of the pendulum to the said index hand, the latter showing thereby on said dial when the vehicle is moving in a curve on a level or banked road, indirectly the side force acting on the turning vehicle, and the increased danger of the vehicle being turned over, when said index hand comes more or less close to one of said two danger hands.

7. In a double acting side force and danger indicator for vehicles, the combination of a casing, a pendulum in said casing, a dial on said casing having two danger marks and a pair of side force scales, the positions of said danger marks on said dial having a fixed relation to the position of the center of gravity of the loaded vehicle, an index hand moving over said pair of scales, the oscillation axis of the pendulum being parallel with and near to the center line of the vehicle, means for transmitting the oscillations of the pendulum to the said index hand, the latter showing thereby on said dial when the vehicle is moving in a curve on a level or banked road, the side force acting on the turning vehicle, and the increased danger of the vehicle being turned over, when said index hand comes more or less close to one of said two danger marks.

In testimony that I claim the foregoing as my invention, I have signed my name in presence of two subscribing witnesses.

MATHIAS J. KLEIN.

Witnesses:
 Jos. Bisbano,
 F. Hogg.

Copies of this patent may be obtained for five cents each, by addressing the "Commissioner of Patents, Washington, D. C."